Patented Dec. 26, 1939

2,185,126

BEST AVAILABLE COPY

UNITED STATES PATENT OFFICE 2,185,126

COATED ARTICLE AND METHOD OF FORMING THE SAME

Roy E. Coleman, Chicago, Ill., assignor, by mesne assignments, to The Zein Corporation of America, a corporation of Delaware No Drawing. Application November 22, 1937, Serial No. 175,889. Renewed August 19, 1939

9 Claims. (Cl. 91—68)

This invention relates to an article of manufacture having a priming or sealing coating and an over-lying surface coating and more particularly to an article of manufacture having a priming or sealing coating containing zein or other prolamin and to the method of forming such articles.

In the following description of my invention I will refer to the preparation of substantially non-aqueous stable priming compositions made from zein derived from corn, but it is to be understood that my invention is also applicable to the preparation of priming compositions made from other prolamins such as, for example, gliadin from wheat, hordein from barley, kafirin from kafir and the prolamins from other cereal grains. The above-mentioned prolamins are at present derived by extraction with an aqueous alcohol solution in which the added water varies generally from about 15 to about 40% of the solvent mixture. The material used in accordance with my invention is the dried extract which may be completely dry or the commercial product which contains a small percentage of moisture.

In the coating of surfaces such as wood, porous paper and the like with a protective or decorative varnish, lacquer, enamel or paint, it is required to first seal the pores of the surface to be coated with a priming or sealing coating. Usually, the priming coating, which may be a rosin priming varnish, lacquer primer, shellac substitute or a solution of shellac or similar material, is applied to the surface to be coated to fill the pores thereof and impart an impervious surface layer which may be smoothed by sanding and thereby provide a suitable surface on which the surface coating may be applied. The priming coatings hitherto in use are not satisfactory, as they are relatively slow drying and do not at once form a hard coat on drying. They, therefore, cannot be sanded down to a smooth clean surface within a short time after application without gumming and clogging up the sand paper and rapidly rendering it ineffective.

In accordance with my present invention, I have found that the above and other objections may be readily overcome by the use of a stable priming or sealing composition made from zein by the aid of anhydrous or substantially anhydrous solvents or solvent mixtures, or by solvents or solvent mixtures containing but small amounts of added water in accordance with the methods set forth in my copending applications Serial Nos. 158,209, 158,210, 158,211, 158,212, 158,213, 158,214 and 158,215, filed August 9, 1937, and Serial No. 158,735, filed August 12, 1937.

The priming or sealing compositions used in accordance with my invention may be either anhydrous or substantially non-aqueous, as desired; however, in no instance is there sufficient water present in these compositions to swell the article to which they are applied or raise the grain of the surface thereof. The priming compositions used in accordance with my invention may contain from 0% to 5% of water, preferably less than 5% of water; and are stable, in so far as separation is concerned, at temperatures of 70° F. and below and in many instances at temperatures of 40° F. and somewhat below. The priming compositions containing from 0% up to 5% of water, when applied to wood, will not cause any swelling or raising of the grain thereof. These stable priming compositions do not have a marked tendency to thicken and gel on standing.

The following detailed descriptions are offered as illustrative examples of priming compositions which may be used in accordance with my invention as well as the methods of preparing the same; however, my invention is not to be construed as limited thereto since other suitable zein priming compositions in other suitable proportions are intended to be included within the scope of my claims. In the examples, the term "parts" indicates parts by weight.

Example 1

10 parts of zein are mixed with 40 parts of diacetone alcohol (acetone free) and heated in the order of about 165° F. for 8 to 10 minutes to form a zein solution. This solution is then thinned with 50 parts of 95% ethanol and then applied to the surface to be primed. The coating dries hard for sanding in from 10 to 15 minutes.

Example 2

10 parts of zein are mixed with 40 parts of a solvent mixture containing 36 parts of 95% alcohol and 4 parts of furfuryl alcohol and heated in the order of about 90° F. to 120° F. for about 8 to 12 minutes to form a zein solution. The solution is then thinned with 40 parts of the solvent mixture and then applied to the surface to be primed. The coating dries hard for sanding in from 8 to 12 minutes.

Example 3

10 parts of zein are mixed with 40 parts of a solvent mixture containing 36 parts of 95% alcohol and 4 parts of linseed fatty acids and heated in the order of about 90° F. to 120° F. for about 8 to 12 minutes to form a zein solution. The solution is then thinned with 60 parts of the solvent mixture and then applied to the surface to be primed. The coating dries hard for sanding in about 7 to 15 minutes.

Example 4

10 parts of zein are mixed with 40 parts of a solvent mixture containing 36 parts of 95% alcohol and 4 parts of ethylene glycol monomethyl ether and heated in the order of about 125° F. to 135° F. for about 6 to 10 minutes to form a zein solution. The solution is then thinned with 50 parts of the solvent mixture and then applied to the surface to be primed. The coating dries hard for sanding in about 5 to 10 minutes.

The characteristics of the zein priming compositions used in accordance with my invention and hence of the ultimate priming coating can be altered at will and as desired by the inclusion in the priming composition of diluents, modifiers, or plasticizers, fillers and the like, as set forth in my above-identified copending applications. The characteristics, such as spread and flow, of these zein priming compositions may also be modified by the addition of a fatty acid such as, for example, oleic, linseed, hemp seed, lauric and like fatty acids and by the inclusion of cetyl, lauryl, myristyl and like fatty alcohols having 8 or more carbon atoms in the chain. If desired, compatible natural and synthetic resins such as, for example, rosin, sandarac, copal, phenol-aldehyde, urea aldehyde, glycerine-phthalic anhydrid, vinyl and like resins, or compatible cellulose derivatives such as, for example, high and low viscosity nitrocellulose, cellulose acetate, methyl and ethyl celluloses and like cellulose derivatives may be incorporated with these zein priming compositions in varying proportions to meet the desired needs.

In producing the article of manufacture embodying my invention, the zein priming compositions may be applied to any porous surface such as, for example, wood, paper, card board and the like by a coating machine, dipping, brushing or spraying process or by any other suitable coating process. The coating fills the pores of the surface being coated and dries in a relatively short time, in the order of about 2 to 10 to 15 minutes at room temperature, as an extremely hard, strongly adherent impervious coating, which may be transparent or opaque as desired. The drying time is, of course, influenced by the characteristics of the solvent utilized in effecting solution of the zein, by the modifying agents, by the thickness of the film, the temperature and humidity of the surrounding drying medium and the like.

Immediately after drying, the priming layer may be sanded and the primed surface freed from all loose particles. If desired, a second priming coating may be applied and then sanded although this is not usually necessary.

After the sanding operation, any of the conventional protective or decorative varnish lacquer, enamel or paint compositions may be applied to the primed surface as a finish coating. These coatings may be applied to the primed surface by any of the conventional coating methods such as by brushing, dipping, spraying, etc. The coatings flow freely and readily over the primed surface and on drying form a strong adherent bond therewith.

Any of the protective or decorative varnishes, lacquers, enamels or paints having either a prolamin, resinous or cellulose derivative base, or mixtures thereof are capable of forming a relatively permanent bond with the primed surface. Thus, varnishes, lacquers, enamels and paints having a zein or other prolamin base as in my above-identified copending application, and in my copending applications Serial Nos. 158,736 and 158,737, filed August 12, 1937; or a resinous base such as, for example, phenol-aldehyde resins, glycerine-phthalic anhydrid, resins, urea-aldehyde resins, vinyl and polymerized vinyl resins and the like; or a cellulose derivative base such as, for example, high or low viscosity nitrocellulose, cellulose acetate, ethyl cellulose and the like have been found to adhere uniformly and relatively permanently to the wood or other surface primed with any of the above or similar priming compositions.

In the claims when I use the expression "substantially non-aqueous" I refer to zein priming compositions or other prolamin priming compositions wherein the added water is preferably 5% or less. When I use the expression "stable" I mean priming compositions which do not separate on standing or even when cooled to temperatures of 50 to 70° F. and somewhat below. The stable substantially non-aqueous priming compositions are capable of drying to a sometimes transparent, flexible, and very hard film.

I claim:

1. As an article of manufacture, paper carrying a plurality of coating layers, one of which is a priming coating formed from a liquid zein composition having from 0 to 5% of added water, said composition being stable against separation of the zein at temperatures of 70° F.

2. As an article of manufacture, cardboard carrying a plurality of coating layers, one of which is a priming coating formed from a liquid zein composition having from 0 to 5% of added water, said composition being stable against separation of the zein at temperatures of 70° F.

3. In the method of coating a surface with a lacquer, paint or enamel, the step of coating the surface with a priming composition comprising an alcoholic solution of zein having from 0 to 5% of added water, said solution being stable against separation of the zein at temperatures of 70° F.

4. In the method of coating a wood surface with a lacquer, paint or enamel, the step of coating the bare wood surface with a priming composition comprising an alcoholic solution of zein having from 0 to 5% of added water, said solution being stable against separation of the zein at temperatures of 70° F.

5. In the method of coating a wood surface with a lacquer, paint or enamel, the step of coating the bare wood surface with a priming composition comprising a solution of zein in a substantially anhydrous zein solvent, said solution being stable against separation of the zein at temperatures of 70° F.

6. An article of manufacture carrying a plurality of coating layers, one of which is a priming coating formed from a liquid prolamin priming composition having from 0 to 5% of added water, said composition being stable against separation of the prolamin at temperatures of 70° F.

7. As an article of manufacture, wood carrying a plurality of coating layers, one of which is a priming coating formed from a liquid zein composition having from 0 to 5% of added water, said composition being stable against separation of the zein at temperatures of 70° F.

8. As an article of manufacture, wood carrying a plurality of coating layers, one of which is a priming coating comprising an alcoholic solution of zein having from 0 to 5% of added water, said solution being stable against separation of the zein at temperatures of 70° F.

9. As an article of manufacture, wood carrying a plurality of coating layers, one of which is a priming coating comprising zein and a substantially anhydrous solvent therefor, said composition being stable against separation of the zein at temperatures of 70° F.

ROY E. COLEMAN.